Oct. 10, 1961   P. BOOKER   3,003,717
FLYING LANDING PLATFORM
Filed July 22, 1960   5 Sheets-Sheet 1
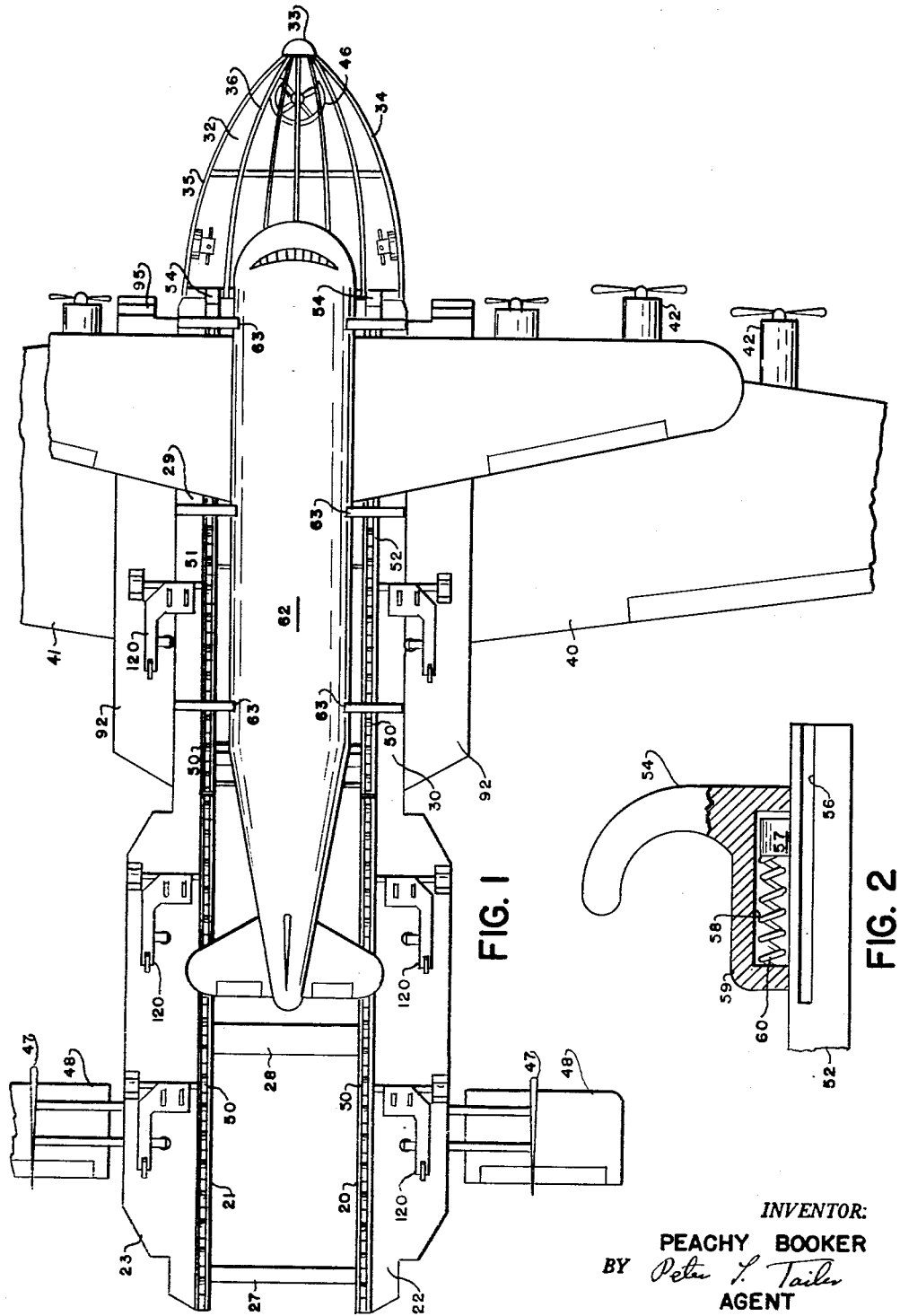
*INVENTOR:*
PEACHY BOOKER
BY Peter S. Tailer
AGENT Oct. 10, 1961 P. BOOKER 3,003,717
FLYING LANDING PLATFORM Filed July 22, 1960 5 Sheets-Sheet 2

INVENTOR:
PEACHY BOOKER
BY Peter L. Tailer
AGENT

Oct. 10, 1961 P. BOOKER 3,003,717
FLYING LANDING PLATFORM
Filed July 22, 1960 5 Sheets-Sheet 3

INVENTOR:
PEACHY BOOKER
BY Peter L. Tailer
AGENT

Oct. 10, 1961   P. BOOKER   3,003,717
FLYING LANDING PLATFORM
Filed July 22, 1960   5 Sheets-Sheet 4

*INVENTOR:*
PEACHY BOOKER
BY *Peter P. Tailor*
AGENT

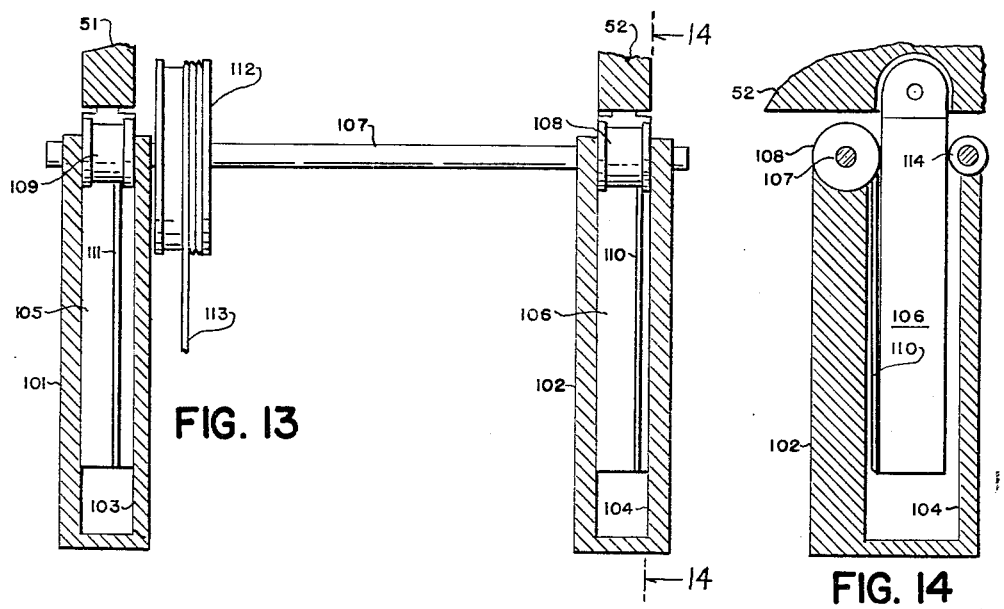
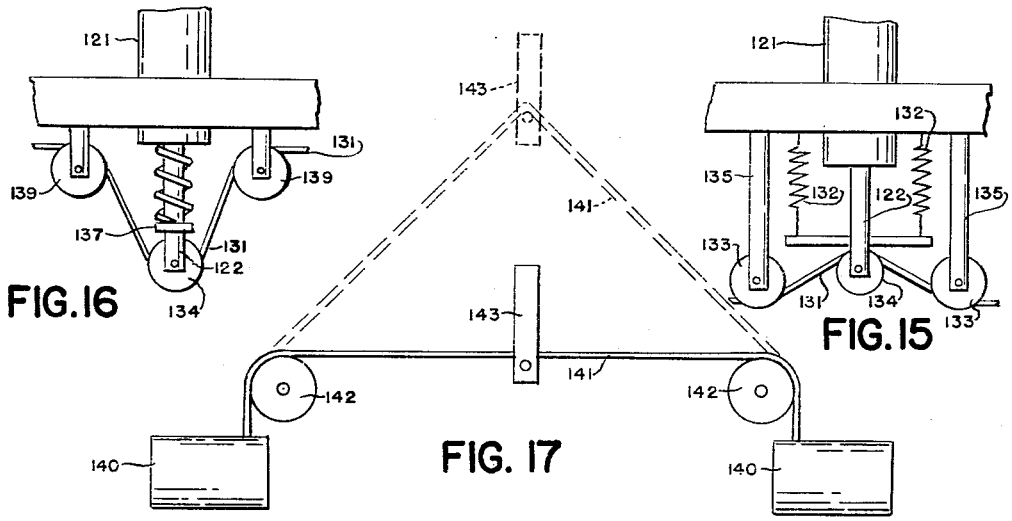

United States Patent Office 3,003,717
Patented Oct. 10, 1961

3,003,717
FLYING LANDING PLATFORM
Peachy Booker, 25 Quogue Road, Riverhead, N.Y.
Filed July 22, 1960, Ser. No. 44,772
9 Claims. (Cl. 244—2)

This invention relates, in general, to aircraft, and, more particularly, to rescue aircraft which may assist disabled aircraft.

An object of this invention is to provide a large flying landing platform which may speed to a disabled aircraft while it is yet airborne so that the disabled aircraft may be safely landed.

Another object of this invention is to provide a flying landing platform for disabled aircraft on which the disabled aircraft may be landed to rapidly evacuate its passengers and personnel whereon, should the disabled aircraft be on fire, it may rapidly be jettisoned.

A further object of this invention is to provide a flying landing platform which is sufficiently rugged so that an aircraft with disabled landing gear may be landed upon it whereon the rescue aircraft may carry the disabled aircraft and make a safe landing with it.

Still another object of this invention is to provide a rescue aircraft having means to securely hold a disabled aircraft landed upon it.

A still further object of this invention is to provide a flying landing platform which is particularly adapted to recover space vehicles after they re-enter the earth's atmosphere.

Yet another object of this invention is to provide a flying landing platform having a portion which is articulated to vary the angle it forms with the path of flight of the flying landing platform.

Additional objects, advantages and features of invention reside in the construction, arrangement and combination of parts involved in the embodiment of the invention and its practice as will be understood from the following description and accompanying drawings wherein:

FIG. 1 is a top view of the rescue aircraft with a disabled aircraft shown secured after landing on it;

FIG. 2 is a side view of a fragment of the front end of one of the landing tracks with a forward arresting hook, partly broken away in section, mounted upon it;

FIG. 13 is a vertical cross-section through the lifting mechanism for the articulated portion of the landing platform;

FIG. 14 is a section taken on lines 14—14 of FIG. 13;

FIG. 15 is a side view of a fragment of an auxiliary support arm raising mechanism;

FIG. 16 is a side view of a fragment of another auxiliary support arm raising mechanism; and FIG. 17 is a top view of an arresting mechanism which may be used with the flying landing platform for the recovery of space vehicles returning into the atmosphere.

Figure 3:
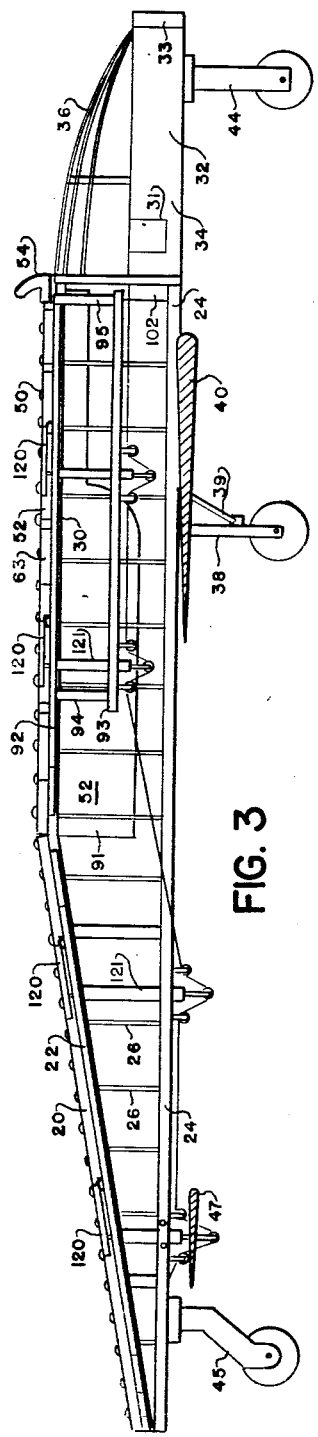
FIG. 3 is a side view of the rescue aircraft with the wings broken away in section and with the articulated portion of the landing platform in the lowered position.

Referring to the drawings in detail, FIGS. 1, 3, 4 and 5 show the general appearance of my rescue aircraft or flying landing platform. Two parallel landing tracks have the rear portions 20 and 21 which are joined to the upper rear deck portions 22 and 23. Lower frame members 24 and 25 extend forward below the upper rear decks 22 and 23 and are joined to them by the vertical structural members 26. Thus the two sides of the rescue aircraft are parallel girder type structures joined by the cross braces 27 and 28 as seen in FIG. 1. Forward extensions 29 and 30 of the upper rear decks 22 and 23 extend forward parallel to the lower frame members 24 and 25 and are also joined to them by vertical structural members 26.

Extending forward from the lower frame members 24 and 25 is the control and passenger carrying compartment 32. Extending back from the nose piece 33 are side walls 34 and 35. Side wall 34 contains the door 31. Longerons 36 extend backward from the nosepiece 33 above the control compartment 32. These may support a transparent covering which would allow visibility from the control compartment while protecting its occupants. Secured to the lower frame members 24 and 25 is the main landing gear 38 which must be very ruggedly constructed to withstand extreme weights. Struts 39 may extend from the main landing gear to brace the front wings 40 and 41. Motors 42, which may be of the propeller driving or the jet type, are mounted under the wings 40 and 41. From beneath the control compartment 33 there extends the single steerable nose wheel 44. Two castering rear landing gears 45 extend from the rearwardly disposed ends of the lower frame members 24 and 25. Therefore, by turning the steerable nose wheel 44 by means of the control wheel 46, as shown in FIG. 1, and by the proper operation of the motors 42, the rescue aircraft may be maneuvered on the ground.

The tail surfaces 47 are supported by suitable struts extending outward from the lower frame members 24 and 25. The tail surfaces 47 have fixed to them the rear wings 48. The rescue aircraft or flying landing platform takes off, flies and lands as does a conventional aircraft.

This invention would be used as a rescue aircraft in the following manner. Upon receipt of a radio communication from a disabled aircraft that its landing gear would not function or that its engines had failed and it could not reach the nearest airport, the rescue aircraft would take off and fly toward the disabled aircraft. On reaching the disabled aircraft, the rescue aircraft would fly beneath it at a slightly slower speed. With the articulated portion of the landing platform in the lowered position as shown in FIG. 3, the disabled aircraft would fly from behind over the rescue aircraft until it contacted the rear landing tracks 20 and 21. The rear landing tracks 20 and 21 have small rollers 50 projecting from their upper surfaces and the forward landing tracks 51 and 52 also have small rollers 50 projecting from their upper surfaces. The rear landing tracks 20 and 21 slope upwards relative to the attitude of the rescue aircraft so that the disabled aircraft must slide upward over the rear landing tracks 20 and 21 and forward along the forward landing tracks 51 and 52 until its front wing strikes the forward arresting hooks 54.

As shown in FIG. 2, the forward landing tracks 51 and 52 each contain a pair of grooves 56 into which downward extensions of the arresting hooks 54 extend to slidably secure them. A lug 57 extends upward from the top of each of the tracks 51 and 52 into a cavity 58 formed in the bottom of each base 59 of an arresting hook 54. A compression spring 60 extends from one end of each cavity 58 to a lug 57 so that, on impact, the arresting hooks 54 may slide forward compressing the springs 60. This absorbs the forward momentum of the disabled aircraft on landing.

Figure 5:
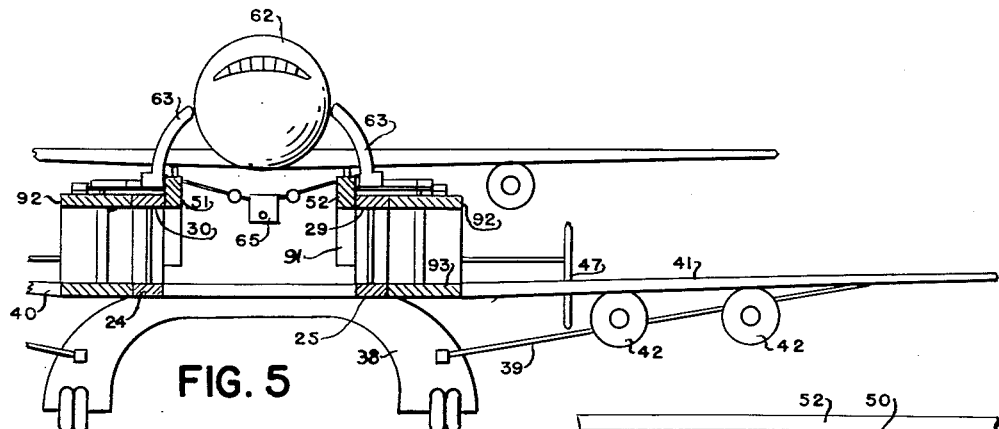
FIG. 5 is a vertical cross-section through the rescue aircraft taken immediately in front of the front wing showing a low wing monoplane secured to the landing platform.
Figure 10:
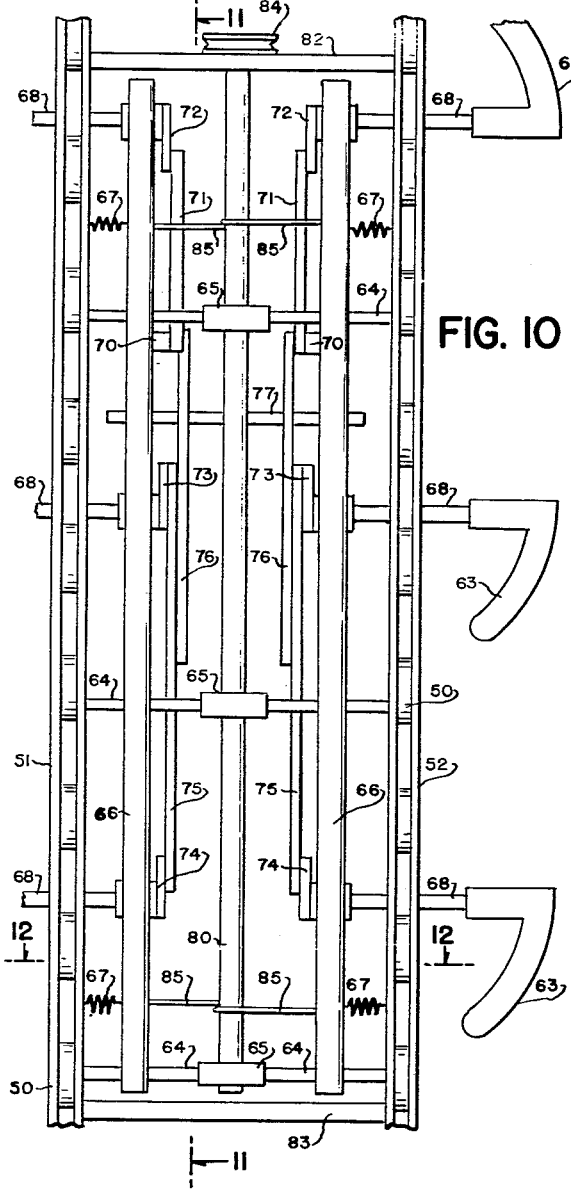
FIG. 10 is a top view of the fuselage clamp actuating mechanism.
Figure 11:
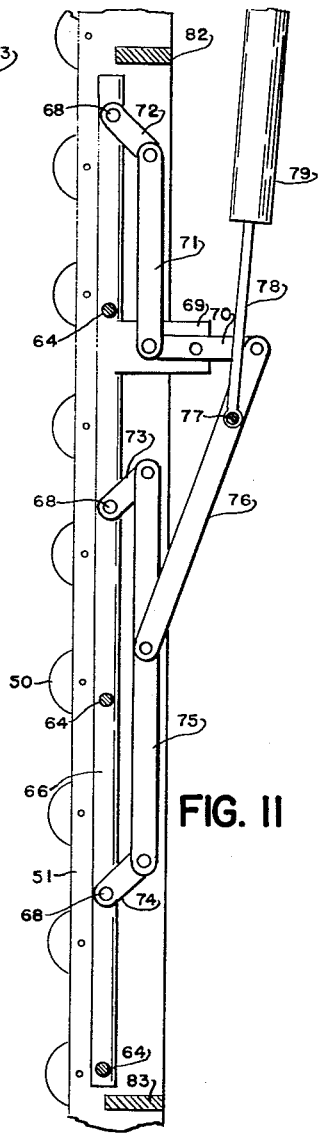
FIG. 11 is a section taken on lines 11—11 of FIG. 10.
Figure 12:
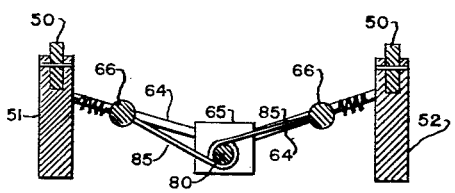
FIG. 12 is a section taken on line 12—12 of FIG. 10.

When the disabled aircraft, generally designated by the numeral 62 in FIGS. 1 and 5, comes to rest against the forward arresting hooks 54, the six fuselage clamps 63 are raised. Referring now to FIGS. 10, 11 and 12, the fuselage clamps 63 are activated in the following manner. The forward landing tracks 51 and 52 are joined by the transverse members 82 and 83. Also extending between the forward landing tracks 51 and 52 are the guide rods 64 which slope downward from the forward landing tracks 51 and 52 to be joined at their inwardly disposed ends by the bearing blocks 65. Two clamp activating members 66 are slidably disposed about the guide rods 64 and urged toward the tracks 51 and 52 by the springs 67. Rotatably disposed through the clamp activating members 66 and rotatably and slidably disposed through the tracks 51 and 52 are the fuselage clamp shafts 68. Referring now to FIG. 11, each clamp activating member 66 has a single downward extension 69 formed integrally with it. Pivotally secured by its center to a lower portion of the extension 69 is a link 70. Attached to the upper end of link 70 is another link 71 which is attached to a toggle 72 mounted on each forward fuselage clamp shaft 68. The toggle 73 and 74 of the intermediate and rear fuselage clamp shafts 68 are joined at their lower ends by the links 75. Two connecting links 76 extend from the bottom of each link 70 to each link 75. A shaft 77 slidably extends through the links 76. A connecting rod 78 from a hydraulic cylinder 79 urges the shaft 77 forward or backward and thus it moves the connecting links 76 forward or backward. Therefore, referring to FIGS. 10, 11 and 12, it may be seen that, as connecting rod 78 extends from the hydraulic cylinder 79, it will urge the connecting link 76 rearward and rotate the link 70 to rotate the forward fuselage clamp shafts 68 counterclockwise and the intermediate and rear fuselage clamp shafts 68 clockwise. This will raise the fuselage clamps 63 into a vertical position. The front wing of a disabled aircraft is positioned between the forward and intermediate fuselage clamps 63 as they are raised.

A central control shaft 80 extends through the bearing blocks 65 and through the transverse member 82. A drum or pulley 84 mounted on control shaft 80 may be rotated by a suitable control wire which passes about it and extends into the control compartment 32. Wires 85 extend from each clamp activating member 66 to the control shaft 80 so that the rotation of control shaft 80 winds the wires 85 about it and draws the clamp activating members 66 inward toward it against the tension of the springs 67. This inward motion of the clamp activating members 66 draws the fuselage clamp shafts inward through the forward landing tracks 51 and 52 to move the fuselage clamps 63 inward. The fuselage clamps 63 may thus be moved inward to grip and secure a disabled aircraft as shown in FIGS. 1 and 5.

Figure 6:
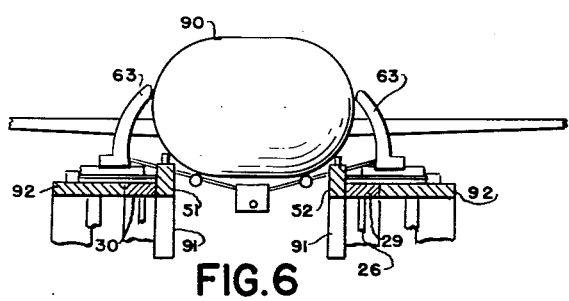
FIG. 6 is a vertical cross-section through an upper fragment of the flying landing platform showing a winged missile secured to it.

Referring now to FIG. 6, it may be seen that aircraft or missiles of different fuselage and wing configurations may be accommodated on this flying landing platform. The larger fuselage 90 spans the tracks 51 and 52 and is readily accommodated by the movable fuselage clamps 63 which then secure it. Once a disabled aircraft has been secured on board this rescue aircraft, the rescue aircraft may then land carrying the disabled aircraft upon it whereon the passengers in the disabled aircraft may be disembarked. Should a more desperate emergency arise such as a fire on the disabled aircraft, the passengers may be directly evacuated from it into the rescue aircraft by means of a suitable chute, folding stairway, or the like. After the passengers and crew have been evacuated from the disabled aircraft, if for safety reasons it is desired to jettison it, the forward landing tracks 51 and 52 are raised to the position shown in FIG. 4. The landing tracks 51 and 52, along with their downward extensions 91, are pivotally secured between the forward extensions 29 and 30. The upper and lower forward decks 92 and 93 are joined by vertical structural members 94 and 95. Transverse rods extend above the forward extensions 29 and 30 to connect the forward landing tracks 51 and 52 with the upper decks 92. The rearwardly disposed portions of the upper decks are also pivotally connected to the forward extensions 29 and 30 so that the upper and lower decks 92 and 93 rise as a unit with the forward landing tracks 51 and 52.

Referring now to FIGS. 13 and 14, the mechanism which raises the forward end of the landing platform operates as follows. Two vertical members 101 and 102 contain the vertical channels 103 and 104 into which extend the lifting rods 105 and 106. The lifting rods 105 and 106 are pivotally attached to the front ends of the forward landing tracks 51 and 52. Extending in back of the lifting rods 105 and 106 is the shaft 107 which is rotatably journaled in the vertical members 101 and 102. The shaft 107 carries the two drums 108 and 109 which have the lines 110 and 111 secured to them and fixed to the bottoms of the lifting rods 105 and 106. A large drum 112 is fixed to the shaft 107 and has the line 113 wound about it. The line 113 extends to a suitable control device within the control compartment 32 so that a tension on line 113 will rotate drum 112 and thereby shaft 107. The rotation of shaft 107 will turn the drums 108 and 109 to wind up the lines 110 and 111 and thus raise the lifting rods 105 and 106. A spring mounted roller 114 holds each lifting rod 105 or 106 toward the drum 108 or 109 which is adjacent to it.

Figure 4:
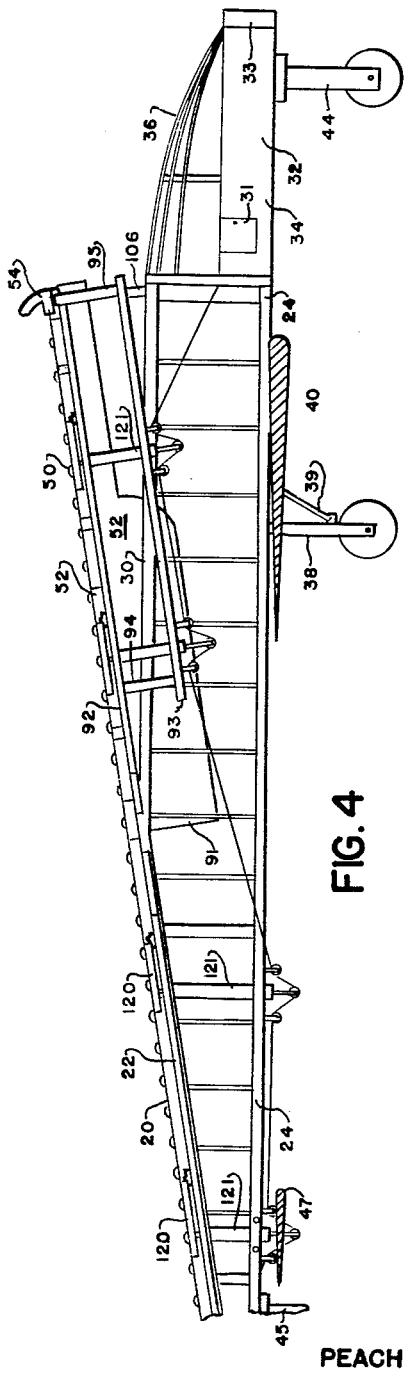
FIG. 4 is a side view of the rescue aircraft with the wings broken away in section and with the articulated portion of the landing platform in the raised position.
Figure 8:
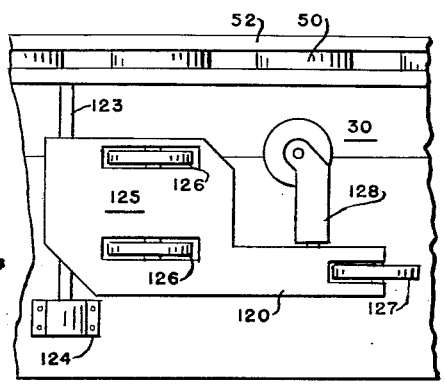
FIG. 8 is a top view of a fragment of the upper deck of the flying landing platform showing an auxiliary support arm in the retracted position.
Figure 9:
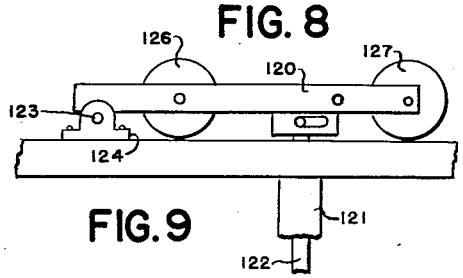
FIG. 9 is a side view of a fragment of the top deck of the flying landing platform showing an auxiliary support arm in the retracted position.

When the forward portion of the landing platform has been raised into the position shown in FIG. 4, a disabled aircraft resting on the landing tracks 20, 21, 51 and 52 will tend to roll rearward on the rollers 50. Should the weight of the disabled aircraft or any damage to the disabled aircraft prevent its rolling rearward on the rollers 50 to slide from the end of the rescue aircraft, the auxiliary support arms 120 may be activated. Referring now to FIGS. 8 and 9, each auxiliary support arm 120 has a large tubular member 121 extending downward below its rearwardly disposed end. A rod 122 extends upward within each member 121 to be slidably connected to each auxiliary support arm 120. The forwardly disposed end of each auxiliary support arm 120 is fixed to a shaft 123 which is rotatably journaled in a landing track and in a pillow block 124. Thus the upward movement of a rod 122 will cause the auxiliary support arm 120 disposed above it to pivot upward about a shaft 123.

Figure 7:
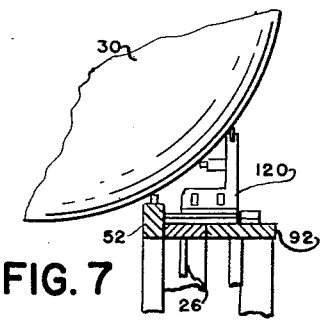
FIG. 7 is a vertical cross-section through a fragment of the top of one side of the flying landing platform showing an auxiliary support arm in a raised position contacting a fragment of the fuselage of a large disabled aircraft.

As may be further seen in FIGS. 8 and 9, each auxiliary support arm has a wider forwardly disposed base portion 125 which carries the two rollers 126. The rearwardly disposed end of each auxiliary support arm carries a single roller 127. Another castered roller 128 is rotatably fixed to extend inward from each auxiliary support arm 120. Thus when the forward portion of the landing platform is raised as shown in FIG. 4, should a disabled aircraft fail to slide rearward to be jettisoned, the auxiliary support arms could be raised to urge it upward and allow it to start to slide rearward on the rescue aircraft. As shown in FIG. 7, should a missile or other object 130 with a large cross-section be landed on the rescue aircraft, the auxiliary support arms could be raised to support a part of its weight.

Referring now to FIGS. 15 and 16, a single control wire 131 may extend from the control compartment 32 beneath all the auxiliary support arms on each side of the rescue aircraft. As shown in FIG. 15, the springs 132 tend to urge the rod 122 upward within the large tubular member 121 to raise the auxiliary support arm disposed above them. A single pulley 134 is disposed within the lower end of each rod 122. Two other pulleys 133 are held below pulley 134 on each side of it by the members 135. Thus a tension in control wire 131 will draw the pulley 134, rod 122 and the auxiliary support arm above it downward to a retracted position. A slackening of the wire 131 will allow the springs 132 to exert an upward force on rod 122 to activate an auxiliary support arm 120. An alternate design, shown in FIG. 16, has a washer 137 mounted on a rod 122 above the pulley 134. A compression spring 138 exerts a downward force on the washer and thereby rod 122 to hold the auxiliary support arm above it in a retracted position. Two pulleys 139 are mounted on each side of the rod 122 and above the pulley 134 so that a tension in the control wire 131 will raise the pulley 134 and thereby the rod 122 to activate each auxiliary support arm 120.

Although this invention was originally conceived for use primarily as a rescue aircraft to save the lives of passengers on commercial airliners, with the addition of the simple arresting gear shown in FIG. 17 it may be used to retrieve missiles re-entering the earth's atmosphere from outer space. Missiles returning to the earth's atmosphere must have a very high velocity. Conventional parachutes and other breaking apparatus may be used to slow such missiles down, but they cannot then be readily landed in a desired location. If a returning space vehicle is provided with large enough wings or air foils so that it may glide to a controlled landing, a great deal of unnecessary weight has to be added to it. However, smaller air foils which will control the glide of a missile at high speeds may be provided without too much corresponding increase in its weight. The flying landing platform, which is the subject of this invention, may be used to retrieve space vehicles having such small air foils. To land such a missile, the landing platform would be raised into the position shown in FIG. 4. The rescue aircraft would then be flown so that the landing tracks were in a substantially horizontal position. This would place the rescue aircraft in a slight dive so that would achieve a maximum speed. Arresting gear, such as that shown in FIG. 17, would be disposed at the rearmost ends of the landing tracks 20 and 21. This arresting gear consists of the winches 140 between which there extends a strong cable 141 about the horizontally disposed pulleys 142. The re-entering space vehicle would be equipped with an arresting hook 143 which would engage the cable 141 as the space vehicle rapidly passed over the rear end of the rescue aircraft. The winches 140 would allow the cable 141 to run out while maintaining a large tension on it to slow the space vehicle down to the speed of the rescue aircraft so that the fusilage clamps could secure it. The rescue aircraft could then be safely landed with the space vehicle.

Therefore, using my invention, a space vehicle which would have to glide at a speed of over 1000 miles an hour would only have to be decelerated 500 miles an hour upon landing on my rescue aircraft if my rescue aircraft attained a velocity of 500 miles an hour itself.

Although I have shown my invention with conventional wings and aircraft engines driving propellers, it could be built in other forms using jet propulsion or the like. Also, it would be possible to augment the lift from the wings of the rescue aircraft by using in conjunction with them suitable downward directed vertical take-off propellers such as ducted fans or folding helicopter type blades. These may be disposed at the wing tips of my rescue aircraft or ducted fans could be installed below its fuselage. Referring to FIG. 1, a suitable ducted fan could be attached to the cross braces 27 or 28 and to similarly situated cross braces disposed toward the front of the rescue aircraft.

While I have disclosed my invention in the best form known to me, it will neveretheless be understood that this is purely exemplary and that modifications in the construction, arrangement and combination of parts and the substitution of equivalents mechanically and otherwise may be made without departing from the spirit of the invention, except as it may be more particularly limited in the appended claims wherein I claim:

1. A flying landing platform comprising, in combination, two parallel girder type structures, cross members joining said girder type structures, two rear landing tracks disposed above said girder type structures and sloping upwards from the rearmost ends of said girder type structures, air foils enabling said flying landing platform to fly attached to said girder type structures, aircraft propulsion means moving said air foils, landing gear fixed to said girder type structures, two forward landing tracks pivotally fixed by their rearmost ends by the front of said rear landing tracks, and means to raise the front portions of said forward landing tracks from a position parallel to said girder type structures to a position in which said forward landing tracks extend upward in line with said rear landing tracks.

2. The combination according to claim 1 with the addition of small rollers journaled in said parallel landing tracks extending above the top surfaces of said landing tracks.

3. The combination according to claim 2 with the addition of forward arresting hooks mounted to extend above the front ends of said forward landing tracks to bring to a stop an aircraft landing on said landing tracks.

4. The combination according to claim 3 with the addition of fuselage clamp shafts slidably and rotably extending through said forward landing tracks, fuselage clamps mounted on said fuselage clamp shafts, means to rotate said fuselage clamp shafts to swing said fuselage clamps from a retracted position parallel to said forward landing tracks to a clamping position normal to said forward landing tracks, and means to draw said fuselage clamp shafts inward.

5. A rescue aircraft comprising, in combination, two parallel girder type structures, cross members joining said girder type structures, two rear landing tracks fixed above said girder type structures and sloping upward from the rearmost portions of said girder type structures, wings fixed to said girder type structures enabling said rescue aircraft to fly, aircraft propulsion means moving said rescue aircraft, landing gear fixed to said girder type structures, two parallel forward landing tracks pivotally secured at their rearwardly disposed ends at the front of said rear landing tracks, means to raise said forward landing tracks from a position parallel to said girder type structures to a position in which said forward landing tracks form extensions of said rear landing tracks, rollers journaled in said landing tracks and extending above their upper surfaces, arresting hooks disposed at the forward ends of said forward landing tracks and extending above their upper surfaces, fuselage clamp shafts slidably and rotably extending through said forward landing tracks, fuselage clamps mounted on said fuselage clamp shafts, guide rods extending inward from said forward landing tracks, two clamp activating members slidably mounted on said guide rods and having said fuselage clamp shafts rotably journaled in said clamp activating members, means associated with said clamp activating members to rotate said fuselage clamp shafts raising said fuselage clamps from a retracted position parallel to said forward landing tracks to an upright clamping position, and means to move said clamp activating members inward drawing said fuselage clamp shafts and said fuselage clamps inward.

6. The combination according to claim 5 wherein said means to move said clamp activating members inward comprises a control rod rotatably journaled between and parallel to said forward landing tracks, wires extending from said clamp activating members to wind about said control rod, and means to rotate said control rod.

7. The combination according to claim 6 wherein there is at least one pair of forwardly disposed fuselage clamps and shafts and at least one pair of rearwardly disposed fuselage clamps and shafts, and wherein said means to rotate said fuselage clamp shafts consists of toggles mounted on said forwardly disposed fuselage clamp shafts, links pivotally mounted by their centers to said clamp activating members, first connecting links extending from one end of said pivotally mounted links to said toggles on said forwardly disposed fuselage clamp shafts, second connecting links attached to the other ends of said pivotally mounted links and connected to said toggles on said rearwardly disposed fuselage clamp shafts, and means to pivot said pivotally mounted link.

8. A rescue aircraft comprising, in combination, two parallel girder type structures, cross members joining said girder type structures, two rear landing tracks fixed above said girder type structures and sloping upward from the rearmost portions of said girder type structures, wings fixed to said girder type structures enabling said rescue aircraft to fly, aircraft propulsion means fixed to said wings, landing gear fixed to said girder type structures, two parallel forward landing tracks pivotally secured at their rearwardly disposed ends at the front of said rear landing tracks, means to raise said forward landing tracks from a position parallel to said girder type structures to a position in which said forward landing tracks form extensions of said rear landing tracks, rollers journaled in said landing tracks and extending above their upper surfaces, arresting hooks disposed at the forward ends of said forward landing tracks and extending above said forward landing tracks, fuselage clamp shafts slidably and rotatably extending through said forward landing tracks, fuselage clamps mounted on said fuselage clamp shafts, guide rods extending inward from said forward landing tracks, two clamp activating members slidably mounted on said guide rods and having said fuselage clamp shafts rotatably journaled in said clamp activating members, means associated with said clamp activating members to rotate said fuselage clamp shafts raising said fuselage clamps from a retracted position parallel to said forward landing tracks to an upright clamping position, means to move said clamp activating members inward drawing said fuselage clamp shafts and said fuselage clamps inward, rear upper decks extending outward from said rear landing tracks, forward upper decks fixed to said forward landing tracks beyond the sides of said girder type structures, auxiliary support arms carrying rollers pivotally secured by their forwardly disposed ends above said decks, and means to pivot said auxiliary support arms upwards.

9. A recovery aircraft for space vehicles re-entering the atmosphere comprising, in combination, two parallel girder type structures, cross members joining said girder type structures, two rear landing tracks fixed above said girder type structures and sloping upward from the rearmost portions of said girder type structures, wings fixed to said girder type structures enabling said recovery aircraft to fly, aircraft propulsion means moving said recovery aircraft, landing gear fixed to said girder type structures, two parallel forward landing tracks pivotally secured at their rearwardly disposed ends at the front of said rear landing tracks, means to raise said forward landing tracks from a position parallel to said girder type structures to a position in which said forward landing tracks form extensions of said rear landing tracks, arresting hooks disposed at the forward ends of said forward landing tracks and extending above said forward landing tracks, fuselage clamp shafts slidably and rotatably extending through said forward landing tracks, fuselage clamps mounted on said fuselage clamp shafts, guide rods extending inward from said forward landing tracks, two clamp activating members slidably mounted on said guide rods and having said fuselage clamp shafts rotatably journaled in said clamp activating members, means associated with said clamp activating members to rotate said fuselage clamp shafts raising said fuselage clamps from a retracted position parallel to said forward landing tracks to an upright clamping position, means to move said clamp activating members inward drawing said fuselage clamp shafts and said fuselage clamps inward, winches disposed at the rear ends of said rear landing tracks, and a cable extending between said winches and between said rear landing tracks, said cable being engaged by a landing space vehicle and being withdrawn from said winches.

References Cited in the file of this patent

UNITED STATES PATENTS

| | | |
|---|---|---|
| 1,874,423 | Belleville | Aug. 30, 1932 |
| 2,370,012 | Crespo | Feb. 20, 1945 |
| 2,471,599 | Young | May 31, 1949 |
| 2,864,572 | Temple | Dec. 16, 1958 |

OTHER REFERENCES

Washington Daily News, Feb. 1, 1950, page 38.